(12) United States Patent
Webb

(10) Patent No.: US 7,289,147 B2
(45) Date of Patent: Oct. 30, 2007

(54) METHOD FOR PROVIDING IMAGE ALIGNMENT FEEDBACK FOR PANORAMA (COMPOSITE) IMAGES IN DIGITAL CAMERAS USING EDGE DETECTION

(75) Inventor: Christopher Webb, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 746 days.

(21) Appl. No.: 10/771,103

(22) Filed: Feb. 3, 2004

(65) Prior Publication Data

US 2005/0179787 A1 Aug. 18, 2005

(51) Int. Cl.
*H04N 5/208* (2006.01)
*H04N 7/00* (2006.01)

(52) U.S. Cl. ......................... 348/252; 348/36
(58) Field of Classification Search ............ 348/36–39, 348/222.1, 252; 382/168, 172
See application file for complete search history.

(56) References Cited

U.S. PATENT DOCUMENTS

| | | | |
|---|---|---|---|
| 5,694,487 A * | 12/1997 | Lee .............................. | 382/201 |
| 6,677,981 B1 * | 1/2004 | Mancuso et al. ............. | 348/36 |
| 7,136,096 B1 * | 11/2006 | Yamagishi et al. ...... | 348/218.1 |
| 2002/0063893 A1 * | 5/2002 | Fujieda ...................... | 358/1.15 |
| 2005/0063610 A1 * | 3/2005 | Wu et al. ................... | 382/294 |

* cited by examiner

*Primary Examiner*—Ngoc-Yen Vu
*Assistant Examiner*—Christopher K Peterson

(57) ABSTRACT

Digital cameras and methods that provide improved image alignment for panorama image capture. The present invention identifies features that will likely be used by a stitching algorithm, and highlights those features for a user by superimposing them on top of a "liveview" image presented on a display of the digital camera. By applying an edge detection algorithm to the previously captured image, the user can select and display those features of the previous image that are relevant to aligning the camera for the subsequent image.

20 Claims, 2 Drawing Sheets

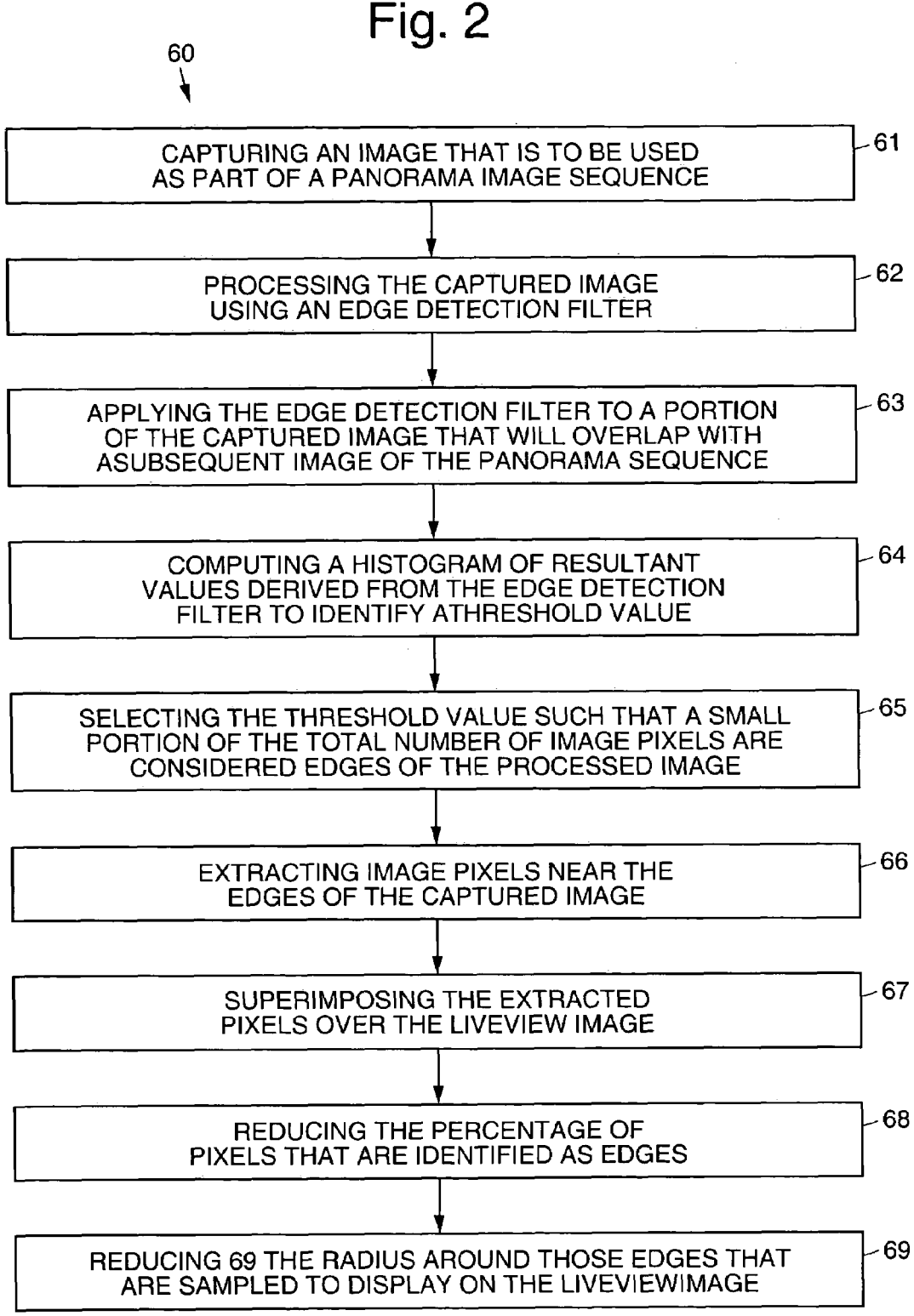

METHOD FOR PROVIDING IMAGE ALIGNMENT FEEDBACK FOR PANORAMA (COMPOSITE) IMAGES IN DIGITAL CAMERAS USING EDGE DETECTION

TECHNICAL FIELD

The present invention relates to digital cameras and methods.

BACKGROUND

Newer model digital cameras have included a "panorama" feature, which allows a user of the digital camera to capture multiple adjacent images that are "stitched" together into a single image at a later time. In order for a stitching algorithm to succeed, there needs to be a substantial overlap between adjacent images so that the stitching algorithm can find features common between the two adjacent images.

The most common existing solutions for providing image alignment feedback to the user consist of one of two techniques. The first technique displays a portion of the previously captured image (usually 33% or 50% of the previous image) adjacent to a reduced-size liveview image. This technique requires the liveview image to be reduced in size, meaning that fewer visual features will be available to the user. This technique is used in Canon digital camera models S30, S40, and S45.

A second technique is to overlay a portion of the previous image opaquely over a full-screen liveview image. While this approach does not reduce the liveview image, it conceals up to half of the liveview by obstructing a substantial portion of the previous image. The disadvantage of this approach is that the user is unable to see any changes in the image composition that takes place in the portion of the liveview image that is obstructed by the overlaid previous image.

SUMMARY OF THE INVENTION

The present invention provides for digital cameras and methods that improves on existing methods of image alignment for panorama image capture. The present invention identifies those features that likely will be used by a stitching algorithm, and it highlights those features for a user by superimposing them on top of a "liveview" image displayed on a display of the digital camera. An edge detection algorithm (filter) is applied to the previously captured image to identify desired edge features, and the camera selects and displays (overlays) those features of the previous image on top of the subsequent "liveview" image that are relevant to aligning the camera for the subsequent image.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 2 is a flow diagram that illustrates an exemplary method in accordance with the principles of the present invention.

DETAILED DESCRIPTION

Figure 1A:
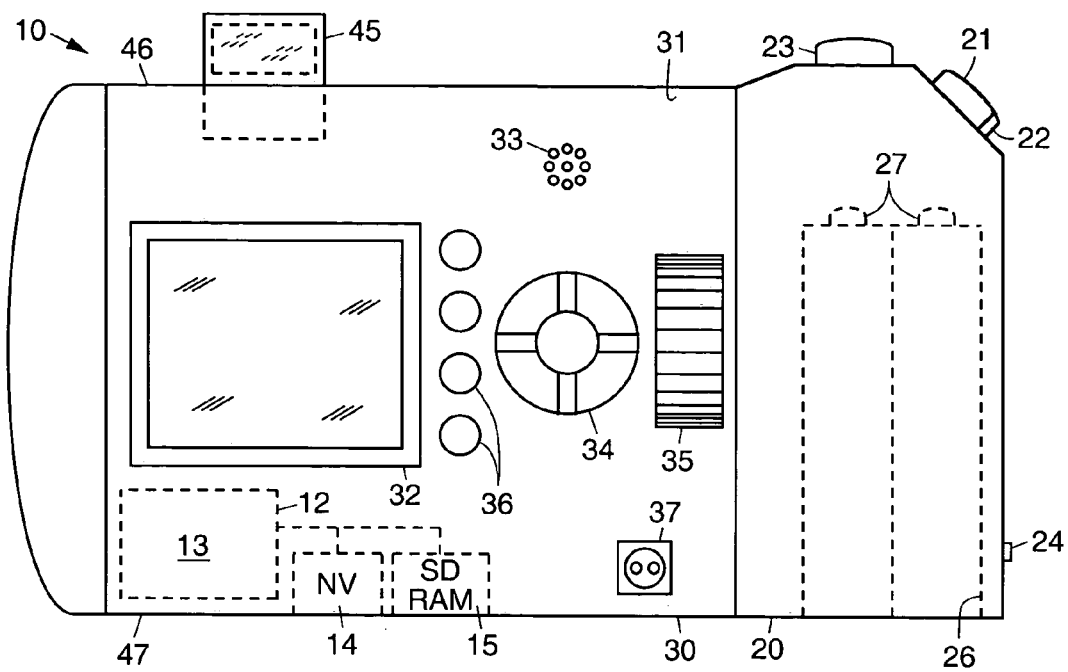
FIGS. 1a and 1b are rear and front views, respectively, of an exemplary digital camera in accordance with the principles of the present invention.
Figure 1B:
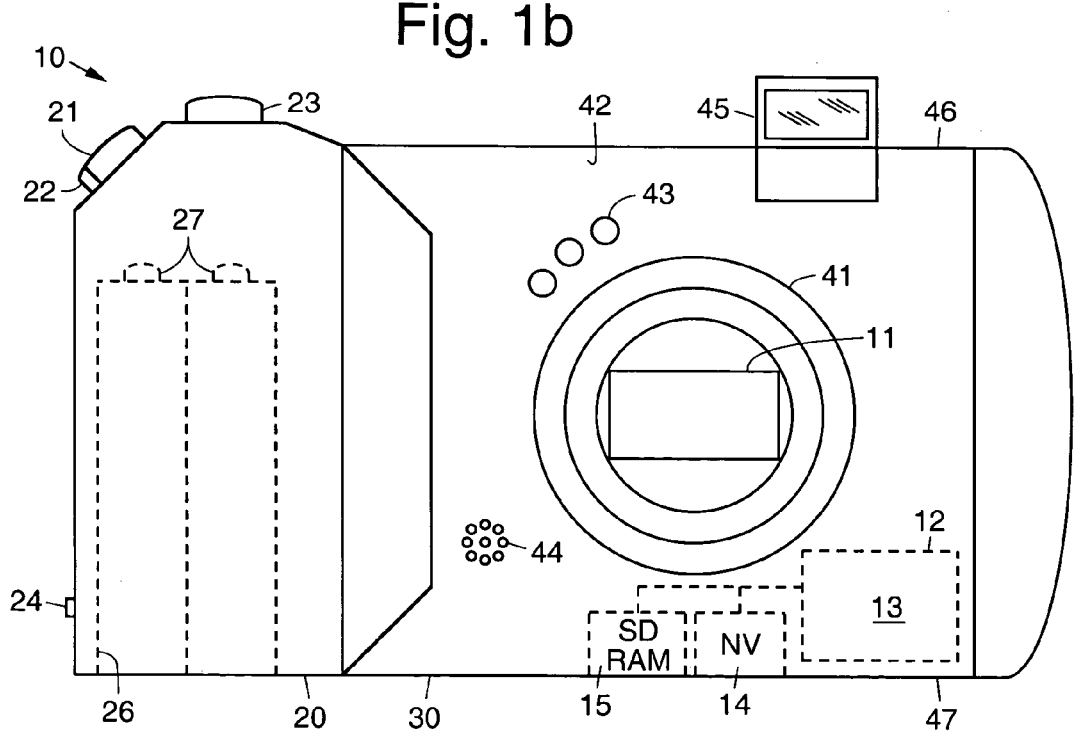

Referring to the drawing figures, FIGS. 1a and 1b are rear and front views, respectively, of an exemplary digital camera 10 in accordance with the principles of the present invention. As is shown in FIGS. 1a and 1b, the exemplary digital camera 10 comprises a handgrip section 20 and a body section 30. The handgrip section 20 includes a power button 21 or switch 21 having a lock latch 22, a record button 23, a strap connection 24, and a battery compartment 26 for housing batteries 27. The batteries may be inserted into the battery compartment 26 through an opening adjacent a bottom surface 47 of the digital camera 10.

As is shown in FIG. 1a, a rear surface 31 of the body section 30 comprises a liquid crystal display (LCD) 32 or viewfinder 45, a rear microphone 33, a joystick pad 34, a zoom control dial 35, a plurality of buttons 36 for setting functions of the camera 10 and an output port 37 for downloading images to a computer, for example. As is shown in FIG. 1b, a zoom lens 41 extends from a front surface 42 of the digital camera 10. A metering element 43 and front microphone 44 are disposed on the front surface 42 of the digital camera 10. A pop-up flash unit 45 is disposed adjacent a top surface 46 of the digital camera 10.

An image sensor 11 is coupled to processing circuitry 12 (illustrated using dashed lines) are housed within the body section 30, for example. An exemplary embodiment of the processing circuitry 12 comprises a microcontroller (µC) 12 or central processing unit (CPU) 12. The CPU 12 is coupled to a nonvolatile (NV) storage device 14, and a high speed (volatile) storage device 15, such as synchronous dynamic random access memory (SDRAM) 15.

In the digital camera 10, the processing circuitry 12 (microcontroller (µC) 12 or CPU 12) embodies a processing algorithm 13 that comprises an edge detection algorithm 13 in accordance with the principles of the present invention to provide image alignment feedback for panorama (composite) images. This will be discussed in more detail with reference to FIG. 2.

An exemplary edge detection algorithm 13 is disclosed in "A Simplified Approach to Image Processing" by Randy Crane, ISBN: 0-13-226416-1. This Laplacian convolution provides a fast and efficient method for identifying edges within an image.

FIG. 2 is a flow diagram that illustrates an exemplary method 60 in accordance with the principles of the present invention. The exemplary method 60 comprises the following steps.

A user captures 61 (stores 61) an image that is to be used as part of a panorama image sequence. The captured image is processed 62 using the edge detection filter 13.

The camera applies 63 the edge detection filter to that portion of the captured image that will overlap with the next image of the panorama sequence. For instance, if the user is taking a sequence of pictures for a panorama composite, traversing from left to right, the camera can apply the edge detection filter to the right half of each image, since the right half of an image will overlap with the left half of the next image.

Once the camera has applied the edge detection filter, it computes 64 a histogram of the resultant values in order to identify a threshold value. The threshold value is selected 65 such that a small portion of the total number of image pixels are considered "edges". For instance, 10-15% of the total pixels may be designated edges. By using the histogramming function, the camera 10 can accommodate either very busy images (those with many edges) or very bland images (those with few edges) without cluttering the liveview image.

Once the edges are identified and the threshold has been applied, the camera extracts 66 the image information (pixels) near the edges from the previously taken image, and superimposes 67 only those pixels over the liveview image. The definition of "near" in this case is dependent on display size, but a radius of 2-3 pixels is considered reasonable.

By applying the method of identifying edge features and superimposing only those elements of the previous image that are near those edges over the current liveview image, the user is provided a full-screen display that is minimally obscured with prior image information. Only those elements of the previous image that are important for alignment obscure the liveview image.

This approach eliminates the disadvantage of using a reduced-size image as found in Canon digital cameras, for example. Furthermore, it eliminates the disadvantage of overlaying a large portion of the previous image (as much as 50% of it) over a full-screen liveview, interfering with the composition of the current image.

This approach also allows a number of adjustments to be made, by either changing 68 the percentage of pixels that will be identified as "edges", or by changing 69 the radius (or extent) around the edges that are sampled to display on the liveview image. By altering the threshold value 65, the user of this technique can alter the number of edges that the user of the camera will see superimposed on the liveview image. A higher threshold value increases the likelihood of the user seeing false edges, while a lower threshold value decreases the number of edges displayed. The false edges that can be detected with a higher threshold may provide more alignment features, but it also obscures more of the current liveview image. Fewer edges decrease the clutter obscuring the current liveview image, allowing for better composition of the current image, but provides fewer features for alignment. Altering the radius of pixels that are sampled around edges likewise alters the level of obscuration of the liveview image. A larger radius includes more features around the edges to use for alignment, but it also obscures more of the liveview image. Conversely, a smaller radius reduces the visibility of alignment features.

This method is easily identifiable in application, since it essentially overlays only edge features from the previous image over the current liveview image. By obscuring the current liveview as little as possible, the camera 10 provides the user the best possible solution to the problem of aligning adjacent images during a panorama sequence.

Thus, digital cameras and methods that use edge detection for providing image alignment feedback for panorama (composite) images have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A digital camera system comprising:
   a lens;
   an image sensor for sensing an image viewed by the lens;
   a display for displaying the image sensed by the image sensor;
   a volatile storage device for storing the image sensed by the image sensor;
   processing circuitry coupled to the display, image sensor, and nonvolatile storage device; and
   a processing algorithm that runs on the processing circuitry that implements an edge detection filter that:
   captures an image that is to be used as part of a panorama image sequence;
   processes the captured image using the edge detection filter;
   applies the edge detection filter to a portion of the captured image that will overlap with a subsequent image of the panorama sequence;
   computes a histogram of resultant values derived from the edge detection filter to identify a threshold value that is related to a number of edges of the processed image;
   alters the threshold value such that the number of displayed edges will be decreased;
   extracts image pixels near the edges of the captured image; and
   superimposes the extracted pixels over the liveview image of the subsequent image.

2. The system recited in claim 1 wherein the processing algorithm further reduces the percentage of pixels that are identified as edges.

3. The system recited in claim 1 wherein the processing algorithm further reduces the radius around those edges that are sampled to display on the liveview image.

4. The system recited in claim 1 wherein the processing algorithm alters the threshold value through reduction of the threshold value such that the number of displayed edges will be decreased.

5. The system recited in claim 1 wherein the processing algorithm promotes a better composition of the image through alteration of the threshold value to decrease the number of displayed edges.

6. The system recited in claim 1 wherein the processing algorithm decreases clutter obscuring the liveview image through alteration of the threshold value to decrease the number of displayed edges.

7. The system recited in claim 1 wherein the processing algorithm alters a level of obscuration of the liveview image through alteration of the radius around those edges that are sampled to display on the liveview image.

8. A method for use in a camera having a display for displaying a liveview image, a lens, an image sensor, a nonvolatile storage device, a volatile storage device, and processing circuitry, the method comprising the steps of:
   capturing an image that is to be used as part of a panorama image sequence;
   processing the captured image using an edge detection filter;
   applying the edge detection filter to a portion of the captured image that will overlap with a subsequent image of the panorama sequence;
   computing a histogram of resultant values derived from the edge detection filter to identify a threshold value that is related to a number of edges of the processed image;
   altering the threshold value such that the number of displayed edges will be decreased;
   extracting image pixels near the edges of the captured image; and
   superimposing the extracted pixels over the liveview image.

9. The method recited in claim 8 further comprising the step of reducing the percentage of pixels that are identified as edges.

10. The method recited in claim 8 further comprising the step of reducing the radius around those edges that are sampled to display on the liveview image of the subsequent image.

11. The method recited in claim 8 wherein the step of altering the threshold value such that the number of displayed edges will be decreased comprises the step of reducing the threshold value such that the number of displayed edges will be decreased.

12. The method recited in claim 8 wherein the step of altering the threshold value such that the number of displayed edges will be decreased comprises the step of promoting a better composition of the image.

13. The method recited in claim 8 wherein the step of altering the threshold value such that the number of displayed edges will be decreased comprises the step of decreasing clutter obscuring the liveview image.

14. The method recited in claim 8 further comprising the step of altering a level of obscuration of the liveview image through alteration of the radius around those edges that are sampled to display on the liveview image.

15. A digital camera system comprising:
a lens;
an image sensor for sensing an image viewed by the lens;
a display for displaying the image sensed by the image sensor;
a volatile storage device for storing the image sensed by the image sensor, processing circuitry coupled to the display, image sensor, and nonvolatile storage device; and
a processing algorithm that runs on the processing circuitry that implements an edge detection filter that:
 captures an image that is to be used as part of a panorama image sequence;
 processes the captured image using the edge detection filter;
 applies the edge detection filter to a portion of the captured image that will overlap with a subsequent image of the panorama sequence;
 computes a histogram of resultant values derived from the edge detection filter to identify a threshold value that is related to a number of edges of the processed image;
 alters the threshold value such that the number of displayed edges will be increased;
 extracts image pixels near the edges of the captured image; and
 superimposes the extracted pixels over the liveview image of the subsequent image.

16. The system recited in claim 15 wherein the processing algorithm alters the threshold value through increase of the threshold value such that the number of displayed edges will be increased.

17. The system recited in claim 15 wherein the processing algorithm increases a number of alignment features through increase of the number of displayed edges.

18. A method for use in a camera having a display for displaying a liveview image, a lens, an image sensor, a nonvolatile storage device, a volatile storage device, and processing circuitry, the method comprising the steps of:
 capturing an image that is to be used as part of a panorama image sequence; processing the captured image using an edge detection filter;
 applying the edge detection filter to a portion of the captured image that will overlap with a subsequent image of the panorama sequence;
 computing a histogram of resultant values derived from the edge detection filter to identify a threshold value that is related to a number of edges of the processed image;
 altering the threshold value such that the number of displayed edges will be increased;
 extracting image pixels near the edges of the captured image; and
 superimposing the extracted pixels over the liveview image.

19. The method recited in claim 18 wherein the step of altering the threshold value such that the number of displayed edges will be increased comprises the step of increasing the threshold value such that the number of displayed edges will be increased.

20. The method recited in claim 18 wherein the step of altering the threshold value such that the number of displayed edges will be increased comprises the step of increasing a number of alignment features through increase of the number of displayed edges.

* * * * *

UNITED STATES PATENT AND TRADEMARK OFFICE
CERTIFICATE OF CORRECTION

PATENT NO. : 7,289,147 B2 Page 1 of 1
APPLICATION NO. : 10/771103
DATED : October 30, 2007
INVENTOR(S) : Christopher Webb It is certified that error appears in the above-identified patent and that said Letters Patent is hereby corrected as shown below:

In column 5, line 29, in Claim 15, after "sensor" delete "," and insert -- ; --, therefor.

Signed and Sealed this

Seventeenth Day of June, 2008

JON W. DUDAS
*Director of the United States Patent and Trademark Office*